USO09000971B2

(12) United States Patent
Crowle et al.

(10) Patent No.: US 9,000,971 B2
(45) Date of Patent: Apr. 7, 2015

(54) RADAR DETECTION IN A BROADBAND RADIO COMMUNICATION SYSTEM

(71) Applicant: Cambium Networks Limited, Ashburton, Devon (GB)

(72) Inventors: Martin Richard Crowle, Ashburton (GB); Nigel Jonathan Richard King, Ashburton (GB); Mark Howard Williams, Ashburton (GB)

(73) Assignee: Cambium Networks Limited, Devon (GB)

( * ) Notice: Subject to any disclaimer, the term of this patent is extended or adjusted under 35 U.S.C. 154(b) by 0 days.

(21) Appl. No.: 14/335,298

(22) Filed: Jul. 18, 2014

(65) Prior Publication Data

US 2014/0328286 A1 Nov. 6, 2014

Related U.S. Application Data

(63) Continuation of application No. PCT/GB2013/000031, filed on Jan. 21, 2013.

(30) Foreign Application Priority Data

Jan. 19, 2012 (GB) .................................. 1200916.3

(51) Int. Cl.
| | |
|---|---|
| G01S 7/40 | (2006.01) |
| H04L 5/00 | (2006.01) |
| G01S 7/02 | (2006.01) |
| H04B 1/10 | (2006.01) |
| H04W 16/14 | (2009.01) |
| H04K 3/00 | (2006.01) |

(52) U.S. Cl.
CPC ............. *H04L 5/0062* (2013.01); *G01S 7/021* (2013.01); *H04B 1/1027* (2013.01); *H04W 16/14* (2013.01);

(Continued)

(58) Field of Classification Search
None
See application file for complete search history.

(56) References Cited

U.S. PATENT DOCUMENTS

2003/0107512 A1 6/2003 McFarland et al.
2004/0201517 A1* 10/2004 MacFarlane Shearer, III .................................. 342/159

(Continued)

FOREIGN PATENT DOCUMENTS

EP 0 452 023 A2 10/1991
EP 1 505 772 A1 2/2005

(Continued)

OTHER PUBLICATIONS

International Search Report and Written Opinion from corresponding PCT application, PCT/GB2013/000031; Jul. 8, 2003; 9p.

*Primary Examiner* — Alex Skripnikov
(74) *Attorney, Agent, or Firm* — Brinks Gilson & Lione

(57) ABSTRACT

Potential radar pulses are detected in a received signal waveform at a terminal of a broadband radio communication system, and a reception time is ascertained for each of the potential radar pulses. A pair of pulses is selected having respective reception times separated by an allowed pulse repetition intervals. One or more further pulses is selected that is related to the selected pair by having a respective reception time separated from the respective reception time of at least one pulse of the pair of pulses by one or more pulse repetition intervals from the set of pulse repetition intervals. At least two other pulses are discounted, that have respective reception times separated by a pulse repetition interval in the set of allowed pulse repetition intervals on the basis of not being related to the selected pair by having a respective reception time separated from the respective reception time of at least one pulse of said pair of pulses by one or more pulse repetition intervals from the set of pulse repetition intervals. The transmission of data is inhibited at least in part in dependence on the selection of the further pulses related to the selected pair.

16 Claims, 4 Drawing Sheets

(52) U.S. Cl.
CPC .............. *H04B 1/3805* (2013.01); *G01S 7/023* (2013.01); *H04K 3/224* (2013.01); *H04K 3/226* (2013.01); *H04K 3/822* (2013.01)

(56) References Cited

U.S. PATENT DOCUMENTS

| | | |
|---|---|---|
| 2006/0258296 A1 | 11/2006 | Steer et al. |
| 2007/0032211 A1 | 2/2007 | Kopikare et al. |
| 2009/0310661 A1* | 12/2009 | Kloper et al. ................ 375/224 |
| 2010/0022213 A1 | 1/2010 | Kopikare et al. |
| 2010/0060508 A1 | 3/2010 | Belcea |
| 2011/0058535 A1 | 3/2011 | Djahanshahi et al. |
| 2011/0150053 A1* | 6/2011 | Kim .............................. 375/219 |

FOREIGN PATENT DOCUMENTS

| | | |
|---|---|---|
| EP | 1 515 488 A1 | 3/2005 |
| EP | 1 752 787 A2 | 2/2007 |
| WO | WO 2010/030665 A2 | 3/2010 |

\* cited by examiner

RADAR DETECTION IN A BROADBAND RADIO COMMUNICATION SYSTEM

RELATED APPLICATIONS

This application is a continuation of PCT Application PCT/GB2013/000031, filed on Jan. 21, 2013 entitled "IMPROVEMENTS TO RADAR DETECTION TRANSMISSION IN A BROADBAND RADIO COMMUNICATION SYSTEM", which claims the benefit of priority to Great Britain Application No. GB 1200916.3, filed on Jan. 19, 2012 entitled "IMPROVEMENTS TO RADAR DETECTION TRANSMISSION IN A BROADBAND RADIO COMMUNICATION SYSTEM", the contents of which are incorporated herein by reference in their entireties.

TECHNICAL FIELD

The present invention relates generally to detection of radar pulses in a wireless communications system, and more specifically, but not exclusively, to a method and apparatus for transmitting data with a reduced rate of inhibitions of transmission due to false alarms of detection of radar pulses on a channel of a broadband radio communications system using Dynamic Frequency Selection (DFS).

BACKGROUND

Increasing demand for wireless services has led to the allocation of increasing amounts of wireless spectrum for use by wireless communications systems, such as point-to-point and point to multi-point broadband radio communications systems. In some cases, bands within the wireless spectrum that were previously allocated for another use have been allocated for use by broadband radio communications systems, as either a licensed or unlicensed band. In particular some bands, for example bands at approximately 5.4 and 5.8 GHz, were formerly allocated exclusively for use by military radar systems. Since such systems are rarely used in most circumstances and at most locations, the bands have been made available for use in addition by, for example, broadband radio communications systems, provided that equipment used in these bands is arranged to detect radar pulses, and to cease transmission on a channel on which radar pulses are detected, so that interference with the operation of the radar may be avoided. In many territories, it is required that equipment be certified to detect specified types of radar pulse transmissions, with a specified range of allowed radar pulse repetition intervals (PRIs) and other specified characteristics such as pulse duration and a threshold for received power in a radar pulse, typically expressed as a received power with respect to an isotropic antenna. If radar pulses with the specified characteristics are detected, a different channel should be selected within a specified time, or if no alternative channel is available, transmission must cease for a specified period; such a process may be referred to as Dynamic Frequency selection (DFS). Typically DFS is required to be implemented in certain frequency bands depending on the territory, and may be required for equipment with a transmit power greater than a specified amount and may be required, for example, for equipment deployed outdoors.

Typically, broadband radio communications equipment for operation in a band where DFS is required must be certified to meet specified requirements regarding probability of detection of radar transmissions. It is typically demanding to meet the specified probability of detection requirements while maintaining an acceptable false alarm rate for radar detection, and as a result prior art systems may have an undesirably high false alarm rate. It is important to maintain a low false alarm rate, since a false alarm may prevent transmission on a frequency channel, which may cause inconvenience to a user.

It is an object of the invention to mitigate the problems with the prior art systems.

SUMMARY

In accordance with a first aspect of the present invention, there is provided a method of transmission of data at a terminal of a broadband radio communication system, the terminal being arranged to inhibit the transmission of data dependent on detection of radar pulses, the radar pulses being transmitted with one or more pulse repetition intervals selected from a set of allowed pulse repetition intervals, the method comprising:

conducting transmission of data in a frequency channel;

receiving a signal waveform at the terminal;

detecting a plurality of potential radar pulses in the received signal waveform;

ascertaining a reception time for each of the plurality of potential radar pulses;

selecting a pair of pulses from the plurality of potential radar pulses, the pair of pulses having respective reception times separated by a selected pulse repetition interval selected from the set of allowed pulse repetition intervals;

selecting one or more further pulses, of the plurality of potential radar pulses, related to said selected pair by having a respective reception time separated from the respective reception time of at least one pulse of said pair of pulses by one or more pulse repetition intervals from the set of pulse repetition intervals;

discounting at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and inhibiting the transmission of data in said frequency channel at least in part in dependence on the selection of the further pulses related to said selected pair.

This has an advantage that potential radar pulses may be discounted from being used to inhibit transmission of data that do not have a reception time that is related to the selected pair by having a respective reception time separated from the respective reception time of at least one pulse of the pair of pulses by one or more pulse repetition intervals from the set of pulse repetition intervals. Such discounted pulses may have an allowed pulse repetition interval between them that is from the set of pulse repetition intervals, but they may not be radar pulses. Discounting such pulses may reducing a false alarm rate of detecting radar pulses. For example, there may be two groups of potential radar pulses detected, one group including the pair of the pulses, the other the discounted pulses. The pulses within each group may be separated by an allowed pulse repetition interval, but the pulses in both groups may not lie on a grid with a spacing corresponding to an allowed pulse repetition interval. In this case, both groups may not be valid detections. This condition may not be detected by a scheme that merely detects a number of allowed pulse repetition intervals that may be found between pulses, but that does not check that they fall on the same grid. The method therefore allows a check to be made on before radar detection is declared to reduce a false alarm rate.

In an embodiment of the invention, inhibiting the transmission of data is not in dependence on the discounted at least two other pulses. This may reduce the false alarm rate.

In an embodiment of the invention, the method comprises:
determining whether at least a pre-determined number of the further pulses have been selected; and
inhibiting transmission of data in said frequency channel at least in part in dependence on said determining.

This has an advantage that pulses that may be false alarms may be excluded from being counted in determining whether a determined number of pulses have been detected. For example, there may be two groups of pulses detected, the pulses in each group being separated by an allowed pulse repetition interval, but the pulses may not lie on a grid with a spacing corresponding to an allowed pulse repetition interval. In this case, both groups may not be valid detections, and so pulses from both groups may not be included as counting towards the pre-determined number of pulses.

In an embodiment of the invention, said selecting comprises:
selecting the one or more further pulses, of the plurality of potential radar pulses, related to said selected pair by having a respective reception time separated from the respective reception time of at least one pulse of said pair of pulses by an integer multiple of a pulse repetition interval from the set of pulse repetition intervals.

This allows selection of pulses in a pulse train having a single pulse repetition interval.

In an embodiment of the invention, said selecting comprises:
selecting the one or more further pulses of the plurality of potential radar pulses having respective reception times separated from the respective reception time of at least one of the said pair by a combination of an integer multiple of the selected pulse repetition interval and an integer multiple of at least a second pulse repetition interval selected from the set of allowed pulse repetition intervals.

This has an advantage that radar having a pulse repetition interval that may have two values may be detected.

In an embodiment of the invention, said selecting comprises:
determining that the one or more further pulses have a sequence of reception times matching a pre-determined allowable sequence of reception times for a radar having pulse repetition intervals alternating between two values.

This has an advantage of allowing detection on the basis of an allowable pattern of pulse repetition intervals, where a pulse repetition interval alternates between two values. The alternation may be pulse to pulse, or between a group of pulses at a first pulse repetition interval and another group of pulses at another pulse repetition interval.

In an embodiment of the invention, said selecting comprises:
determining that the one or more further pulses have a sequence of reception times matching a pre-determined allowable sequence of reception times for a radar having pulse repetition intervals having three or more values.

This has an advantage of allowing detection on the basis of an allowable pattern of pulse repetition intervals where a pulse repetition interval varies between three or more values according to an allowed pattern.

In an embodiment of the invention, said detecting of the plurality of potential radar pulses in the received signal waveform comprises:

comparing a power of the received waveform with a threshold; and
detecting a detected pulse in dependence on the power of the received waveform being above the threshold.

This is a convenient way of detecting pulses that may be potential radar pulses.

In an embodiment of the invention, said detecting of the plurality of potential radar pulses in the received signal waveform comprises:
determining a duration of a detected pulse; and
identifying the detected pulse as a potential radar pulse on a basis of the duration of the detected pulse.

This has an advantage that pulse with a duration that does not correspond to an allowable duration for a radar pulse may be rejected as a potential radar pulse.

In an embodiment of the invention, said detecting the plurality of potential radar pulses in the received signal waveform comprises:
determining whether each detected pulse may be received as a wanted signal of the wireless communication system; and
identifying a detected pulse as a potential radar pulse on a basis of the determination as to whether each detected pulse may be received as a wanted signal of the wireless communication system.

This has an advantage that pulses may be determined not to be potential radar pulses if the pulse is received as a wanted signal at the receiver.

In an embodiment of the invention, determining whether each detected pulse may be received as a wanted signal of the wireless communication system comprises receiving a training sequence of a wanted signal.

This is a convenient way of determining that a signal is a wanted signal and therefore not a radar pulse. Typically, a training sequence is received at the beginning of a radio transmission and confirmation that it is valid may be available to a radar pulse detection circuit.

In an embodiment of the invention determining whether each detected pulse may be received as a wanted signal of the wireless communication system comprises receiving a cyclic prefix of an Orthogonal Frequency Division Multiplexing (OFDM) signal.

This is a convenient way of determining that a signal is a wanted signal and therefore not a radar pulse in a broadband radio communications system using OFDM.

In an embodiment of the invention said detecting of the plurality of potential radar pulses in the received signal waveform comprises detecting an error in the reception of a wanted signal of the wireless communication system.

This has an advantage that a radar pulse may be detected even in the case that it is received at a lower level than a wanted signal, on the basis of errors it may cause to the reception of the wanted signal.

In an embodiment of the invention the broadband radio communication system operates according to IEEE 802.11, for example according to IEEE 802.11 a, b, g, n or another variant.

In accordance with a second aspect of the present invention, there is provided a terminal for transmission of data in a broadband radio communication system, the terminal being arranged to inhibit the transmission of data dependent on detection of radar pulses, the radar pulses being transmitted with one or more pulse repetition intervals selected from a set of allowed pulse repetition intervals, the terminal comprising:
a transmitter arranged to conduct transmission of data in a frequency channel;
a receiver arranged to receive a signal waveform at the terminal;

a detector arranged to detect a plurality of potential radar pulses in the received signal waveform; and a processor arranged to:

ascertain a reception time for each of the plurality of potential radar pulses;

select a pair of pulses from the plurality of potential radar pulses, the pair of pulses having respective reception times separated by a selected pulse repetition interval selected from the set of allowed pulse repetition intervals;

select one or more further pulses, of the plurality of potential radar pulses, related to said selected pair by having a respective reception time separated from the respective reception time of at least one pulse of said pair of pulses by one or more pulse repetition intervals from the set of pulse repetition intervals;

discount at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and inhibit the transmission of data in said frequency channel at least in part in dependence on the selection of the further pulses related to said selected pair, and not in dependence on pulses not selected as the further pulses.

In accordance with a third aspect of the present invention, there is provided a non-transitory computer readable medium having instructions to cause a processor to cause a terminal to perform a method of transmission of data at a terminal of a broadband radio communication system, the terminal being arranged to inhibit the transmission of data dependent on detection of radar pulses, the radar pulses being transmitted with one or more pulse repetition intervals selected from a set of allowed pulse repetition intervals, the method comprising:

conducting transmission of data in a frequency channel;

receiving a signal waveform at the terminal;

detecting a plurality of potential radar pulses in the received signal waveform;

ascertaining a reception time for each of the plurality of potential radar pulses;

selecting a pair of pulses from the plurality of potential radar pulses, the pair of pulses having respective reception times separated by a selected pulse repetition interval selected from the set of allowed pulse repetition intervals;

selecting one or more further pulses, of the plurality of potential radar pulses, related to said selected pair by having a respective reception time separated from the respective reception time of at least one pulse of said pair of pulses by one or more pulse repetition intervals from the set of pulse repetition intervals;

discounting at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and inhibiting the transmission of data in said frequency channel at least in part in dependence on the selection of the further pulses related to said selected pair.

Further features and advantages of the invention will be apparent from the following description of preferred embodiments of the invention, which are given by way of example only.

DETAILED DESCRIPTION OF THE DRAWINGS

By way of example, embodiments of the invention will now be described in the context of a broadband point-to-point radio communications system operating in accordance with an IEEE 802.11a, b, g or n standard. However, it will be understood that this is by way of example only and that other embodiments may involve other wireless systems, and in particular point-to-multipoint systems.

Figure 1:
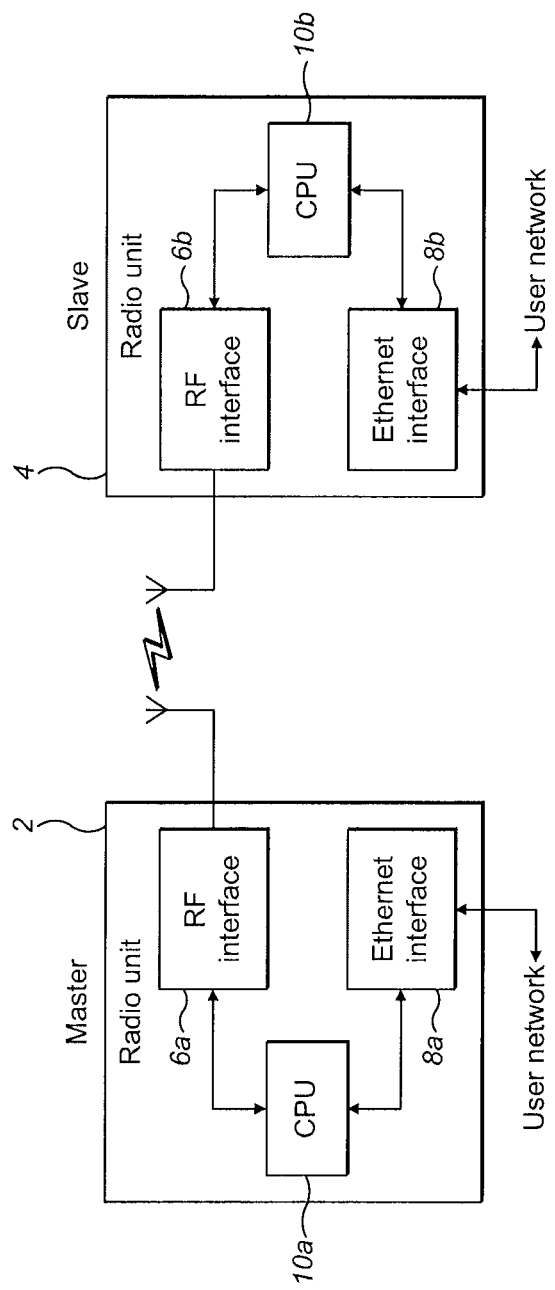
FIG. 1 is a block diagram showing a radio communication system according to an embodiment of the invention.

FIG. 1 illustrates a radio communication system comprising two radio terminals 2, 4 according to an embodiment of the invention arranged as an Internet Protocol (IP) broadband radio communication system. The system may operate, for example, within a band at approximately 5.4 GHz in a territory in which Dynamic Frequency Selection (DFS) is required. For example, the system may be deployed outdoors, and typically high gain antennas may be used, which may have a gain relative to isotropic radiation of, for example, 23 dBi, so that signals may be transmitted at sufficiently high isotropic power that the terminal is required to implement DFS and detect a specified range of radar pulse types, for example radar pulses being transmitted with one or more pulse repetition intervals selected from a set of allowed pulse repetition intervals.

As shown in FIG. 1, a signal waveform may be received at the terminal, for example the master terminal 2. The signal waveform may be checked for the presence of radar pulses, in order to determine whether to inhibit transmission as part of the requirement for DFS. The signal may be detected at the RF interface 6a, 6b, 6, the RF interface being shown in more detail in FIG. 2.

The received waveform may pass through an Automatic Gain Control (AGC) stage 12, and an Analogue to Digital Converter (ADC) 14 before being passed to the level detector 20, and then the radar detector 22.

Typically at the radar detector 22, potential radar pulses may be identified in the received signal waveform by comparing a power of the received waveform with a threshold and detecting a detected pulse in dependence on the power of the received waveform being above the threshold. Also at the radar detector 22, a duration of a detected pulse may be determined and the detected pulse may be identified as a potential radar pulse on a basis of the duration of the detected pulse. A detected pulse having a duration that does not correspond to an allowable duration for a radar pulse may be rejected as a potential radar pulse.

Figure 2:
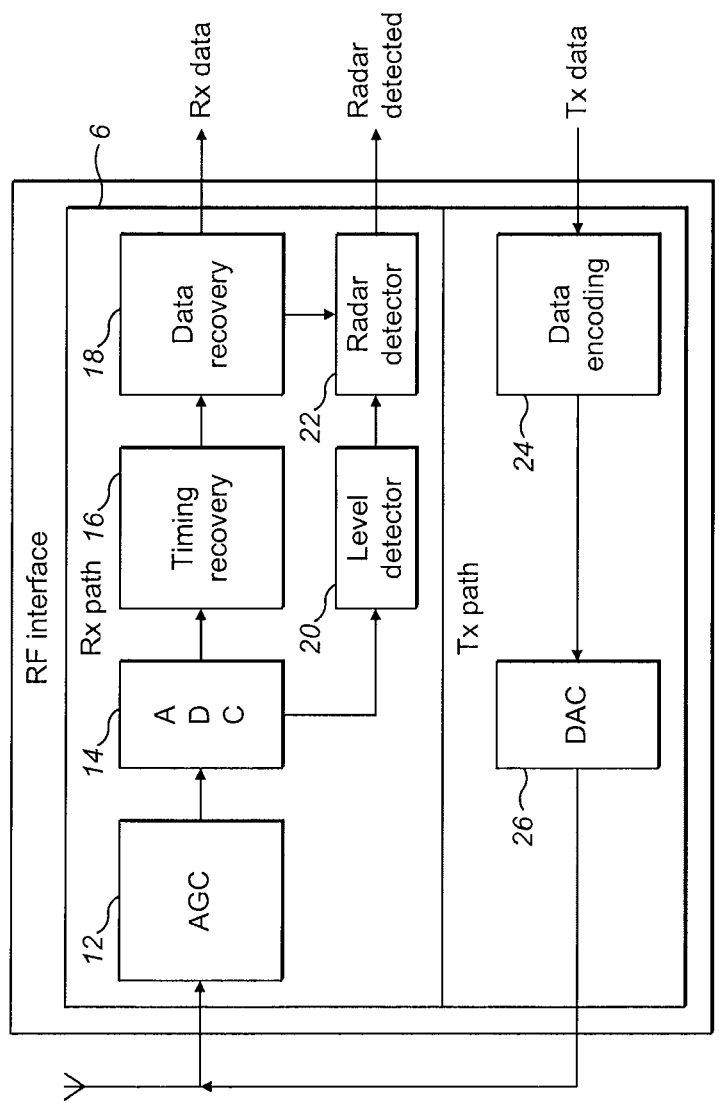
FIG. 2 is a block diagram showing an RF interface of a terminal in an embodiment of the invention.

As may be seen in FIG. 2, the radar detector 22 may have a link to the data recovery section 18, in which wanted signals are received. A pulse may be detected as a potential radar pulse on a basis of the determination as to whether each detected pulse may be received as a wanted signal of the wireless communication system; if the pulse is a wanted signal, then it may be rejected as a potential radar pulse. This may be determined by receiving a training sequence of a wanted signal. Typically, a training sequence is received at the beginning of a radio transmission and confirmation that it is valid may be available to a radar pulse detection circuit. For example, a determination as to whether each detected pulse may be received as a wanted signal of the wireless communication system comprises receiving a cyclic prefix of an orthogonal frequency division multiplexing (OFDM) signal. This is a convenient way of determining that a signal is a wanted signal and therefore not a radar pulse in a broadband radio communications system using OFDM.

It can be seen that there may be various ways of rejecting pulses as potential radar pulses, and thereby increasing the probability that pulses remaining in a set of potential radar pulses are valid radar pulses.

In an embodiment of the invention, a reception time is ascertained for each potential radar pulse, and the pulse may be marked, that is to say associated, with a time stamp. The reception time may be, for example, a time on a relative scale in arbitrary units, or a factor related to a time of arrival or detection of a pulse.

In an embodiment of the invention, potential radar pulses detected in a given period are logged, together with their time stamp. The logged pulses may be stored together with their measured power levels and durations.

The logged pulses for the given period may be analysed to determine which detected pulses should be retained as potential radar pulses, and which should be rejected, on a basis comprising the received power level and duration of the pulses; these should be within expected levels for at least one of radar transmission type that is specified as being a type that the terminal is required to detect.

The pulses retained after this initial sorting process are analysed to determine the intervals between them. Each determined interval may be compared with pulse repetition intervals allowed for a radar type that the terminal is required to detect, and also compared with integer multiples of the allowed pulse repetition intervals. The use of integer multiples is to allow for missed detection of pulses, for example caused by the terminal transmitting or receiving at the same time that a pulse arrived at the receiver; typically pulses cannot be detected when the receiver is transmitting or receiving. For a radar type that operates with a pulse repetition interval that changes during a sequence of pulses, intervals comprising a combination of two or more different pulse repetition intervals may be allowed to cover a case in which detection of a pulse is missed between two different pulse repetition intervals.

For convenience of analysis, the determined intervals may be arranged in ascending order of length; shorter periods may be analysed first, since these may be more likely to result in detection of a valid radar pulse train.

As a result of the process of comparing pulse repetition intervals with allowed values, it may be found that some of the determined intervals are rejected. The remaining intervals may be examined to determine the number of intervals corresponding to each allowed pulse repetition interval. If there are more than a determined qualifying number of valid intervals corresponding to an allowed pulse repetition interval or an integer multiple of the allowed pulse repetition interval, then provisional detection of a valid radar pulse train may be declared.

However, simply counting the number of valid intervals at a pulse repetition frequency may result in a false detection. For example, it may be that some of the intervals have arisen by chance, due to detection of a non-radar pulse, for example due to reception of some type of interference. In order to reject these falsely detected intervals (and one or both of the detected pulses defining the interval), in an embodiment of the invention, the time stamps, that is to say the reception times, of pulses in a provisionally detected pulse train are analysed to determine whether or not the pulses have a reception pattern corresponding to an allowed pattern for a radar type that the terminal is required to detect. For example, it may be determined whether pulses having a single pulse repetition interval fall onto a regular grid or raster. This may be determined by analysing whether or not each interval between pulses in a provisionally detected pulse train is an integer multiple of the pulse repetition interval of the provisionally detected pulse train. If no common grid can be found for the provisionally detected pulse train, or if it is determined that a group of one or more pulses does not fall on the same grid as another group of pulses, then pulses not falling on the grid may be discounted as potential radar pulses. If the number of remaining potential radar pulses is not greater than a determined sufficient number of pulses to detect a valid pulse train, then provisional detection of a pulse train is withdrawn, and a potential false alarm leading to inhibition of transmission may have been prevented.

The process of checking whether a provisionally detected pulse train falls on a valid grid may proceed as follows:

A pair of pulses may be first selected from potential radar pulses, the pair of pulses having respective reception times separated by an interval corresponding to an allowed pulse repetition interval. That is to say a pair of pulses either side of a potentially valid pulse repetition interval are selected. For example, a pair of pulses with a high probability of being valid pulses may be detected, due for example to a good match to expected received power or duration, or for example consistent received power between the two pulses. In addition or alternatively, a pair of pulses may be selected which have an interval between them that is a good match to an allowed pulse repetition interval. A pair of pulses may be selected on the basis of having the shortest interval. Alternatively, a pair of pulses may be selected by another method or at random.

Having selected a pair of pulses as a starting point, a search may be carried out to select further potential radar pulses having a reception time separated from the reception time of at least one pulse of the pair of pulses used as a starting point, by one or more pulse repetition intervals from a set of allowed pulse repetition intervals.

However, pulses from the plurality of potential radar pulses that have respective reception times separated by a pulse repetition interval in the set of allowed pulse repetition intervals may be discounted from selection on the basis of not being related to the selected pair by having a respective reception time separated from the respective reception time of at least one pulse of said pair of pulses by one or more pulse repetition intervals from the set of pulse repetition intervals. In other words, although the separation between the pulses may be an allowable value for a radar pulse, the pulses are discounted as being radar pulses since they are not related by an allowed interval from a pair of pulses assumed to be radar pulses. In an embodiment of the invention, at least two pulses may be discounted.

The transmission of data in the frequency channel is inhibited at least in part in dependence on the selection of the further pulses related to the selected pair, and preferably not in dependence on the discounted pulses.

If the search does not identify sufficient further potential radar pulses, the inhibition of transmission of data on a currently selected frequency channel may be suppressed. It may be determined whether at least a pre-determined number of the further pulses have been selected, and transmission of data in the frequency channel may be inhibited at least in part in dependence on the determination.

In this way, potential radar pulses that do not have a reception time that has a respective reception time separated from the respective reception time of at least one pulse of the selected pair of pulses by one or more pulse repetition intervals from the set of pulse repetition intervals may be excluded from being identified for use in inhibiting transmission, thereby reducing a false alarm rate.

In an embodiment of the invention, a plurality of potential radar pulses has been selected, each pulse in the subset having a reception time that is separated by a selected pulse repetition interval from a reception time of another pulse in the subset. That is to say the subset may be a set of pulses defining pulse repetition periods that are the same as each other, and that correspond to an allowed pulse repetition period. The subset may be for example, a provisionally detected radar pulse train. The searching for further pulses may comprise searching within the subset.

In an embodiment of the invention, for example for analysing a provisionally detected pulse train comprising two or more pulse repetition intervals, searching for further pulses starting from a selected pair may search for integer multiples of each of the allowed pulse repetition intervals and also may search for combinations of the pulse repetition intervals. So, a search may be carried out for one or more further potential radar pulses having respective reception times separated from the respective reception time of at least one of the said pair by a combination of an integer multiple of the selected pulse repetition interval and an integer multiple of at least a second pulse repetition interval selected from the set of allowed pulse repetition intervals. As before, if the search does not detect sufficient further pulses to detect a valid pulse train, then a false alarm may be suppressed.

As a further check of a provisionally detected radar pulse train, the pattern of pulse repetition intervals may be detected against an allowed sequence for a radar type that the terminal is required to detect. So, it may be determined whether the one or more further potential radar pulses have a sequence of reception times matching a pre-determined allowable sequence of reception times for a radar having pulse repetition intervals alternating between two values. This may allow detection on the basis of an allowable pattern of pulse repetition intervals, where a pulse repetition interval alternates between two values. The alternation may be pulse to pulse, or between a group of pulses at a first pulse repetition interval and another group of pulses at another pulse repetition interval.

A similar further check may be carried out to determine whether the one or more further pulses have a sequence of reception times matching a pre-determined allowable sequence of reception times for a radar having pulse repetition intervals having three or more values. This may allow detection on the basis of an allowable pattern of pulse repetition intervals where a pulse repetition interval varies between three or more values according to an allowed pattern.

In an embodiment of the invention the identification of the plurality of potential radar pulses in the received signal waveform may comprises detecting an error in the reception of a wanted signal of the wireless communication system, so that that a radar pulse may be detected even in the case that it is received at a lower level than a wanted signal, on the basis of errors it may cause to the reception of the wanted signal.

Embodiments of the invention will now be described in more detail.

Returning to FIG. 1, it may be seen that FIG. 1 shows an internet protocol (IP) broadband radio communication system, where the radio is being used to bridge between two user network nodes, so as to seamlessly join the two networks. The figure shows two radio units, that is to say terminals, which may be identical, but one is deemed to be the Master unit 2. The Master unit 2 typically takes the lead in link establishment, performing channel selection operations, for example, and the Slave unit 4 connects to the Master. The Central Processing Unit (CPU) block 10a, 10b shown in FIG. 1 controls the operation of the terminal including the radio and is used to route packets to and from the Ethernet interface and radio frequency (RF) interface. A computer program to control the terminal to perform the method of the invention may run on CPU. The Ethernet Interface 8a, 8b is typically the IEEE802.3 interface used to connect to the user network. The RF interface block 6a, 6b, 6 is typically an IEEE802.11 interface providing encoding and decoding of user data for transfer over the air interface.

FIG. 2 is a simplified block diagram of the RF interface block. As shown in FIG. 2, the AGC block 12 provides Automatic Gain Control for the radio front end, to provide sufficient dynamic range for the subsequent signal recovery steps. The ADC block 14 is an Analogue to Digital Converter. The Timing Recovery block 16 provides synchronization to the encoded data, and the Data Recovery block 18 provides recovery of the user data from the radio signals, using for example Fast Fourier Transform (FFT) and Forward Error Correction (FEC) Techniques. The Level Detector block 20 evaluates the RF energy present and indicates to the Radar Detector block 22 if it exceeds the radar detection threshold. The Radar Detector block 22 evaluates the RF level from the detector block to check if the energy could be from a radar pulse, and it also takes input from the Data Recovery block 18. Since the energy in a received (Rx) signal often exceeds the radar threshold, the presence of valid received data may establish that a raised level is not a radar pulse. So, if the transmitter is active or if valid received data is present, the Radar Detected signal may not be asserted in response to the Level Detector 20.

Referring again to FIG. 2, the radio transmit (Tx) path incorporates at least a Data Encoding block 24, which is essentially the inverse of the Data Recovery block 18, using for example FEC encoding techniques, and a DAC block 26 which is a Digital to Analogue Converter.

As can be seen from FIG. 1, a packet received at the Ethernet interface 8a on the Master radio unit 2 may be processed by the CPU 10a and supplied to the RF interface 6a for transmission to the Slave radio unit, that is to say Slave terminal 4. The Slave radio unit receives the data on the RF interface 6b and subsequently transmits it on the Ethernet Interface 8b. With this operation, it is apparent that the RF activity is directly related to the Ethernet interface activity, hence the operation of the radio is subject to the user environment.

When the radio is intended for operation in a region or territory requiring Dynamic Frequency Selection, for example operating according to ETSI EN 301 893 V1.5.1, ETSI EN 302 502 V1.2.1 or FCC 06-96, a high probability of radar pulse detection is required. A radar pulse train may consist of, for example, between 9 and 45 pulses with a pulse interval, for example, from 150 us to 5 ms.

A radio link may typically operating at receive levels where the level of the wanted (data) signal is higher than the radar signals and as such these type of radio interfaces suffer from many false detects, since any interferer has the potential to corrupt the radio coding and with this lost, there may be nothing to distinguish the corrupted wanted signal from a radar interferer. Due to the necessity to provide a high detection probability of radar patterns for regulatory compliance, it is preferable to take note of every radar detection notification that the radio interface provides. The regulations require that the radio transmission must cease within a given time of radar detection and the transmission must remain muted for a given duration. It may be straightforward to comply with this detection requirement by readily triggering on radar events and ceasing transmissions, but such behavior may result in a significant degradation in the link availability and considerable inconvenience for the network operator.

In an embodiment of the invention, each detection of a potential radar pulse may be evaluated to estimate its validity, and the pulse train is reconstructed to ensure consistency of the pattern. That is, the Pulse Repetition Interval (PRI) is determined by inspecting the interval between radar detections and this is then used to validate each of the radar detections.

Figure 3:
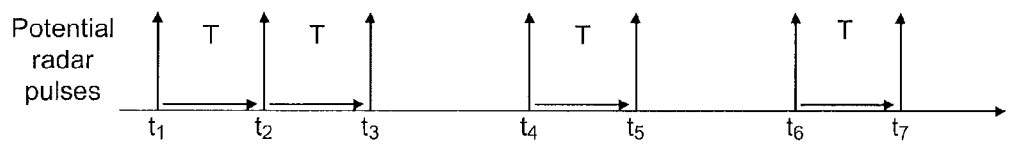
FIG. 3 is a schematic diagram showing a sequence of potential radar pulses.
Figure 4:
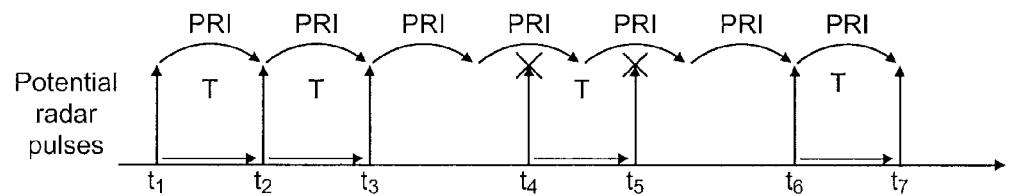
FIG. 4 is a schematic diagram illustrating identification of potential radar pulses as valid radar pulses.

FIG. 3 shows a sequence of detections of potential radar pulses, with the intervals $t_{12}$, $t_{23}$, $t_{45}$ and $t_{67}$ (where $t_{12}$ indicates the interval between the pulses at reception times $t_1$ and $t_2$, for example) each having the common time interval T, which is subsequently determined to be the fundamental PRI of the provisionally detected radar sequence, that is to say provisionally detected radar pulse train. The determined PRI is then used to determine how many of the radar detections fall onto a consistent timebase, that is to say a common grid or raster. In the example shown in FIG. 4, it can be seen that the potential radar pulses at $t_4$ and $t_5$ do not match the timebase and can be rejected from consideration. It can be seen that the time interval $t_{26}$ in this example is actually a multiple of the PRI and would be recognized as part of the radar sequence $t_1$, $t_2$, $t_3$, $t_6$, $t_7$. The missing pulses may be presumed to be a result of receive or transmit radio activity. The decision as to whether or not this is a radar event may be made based on the determined PRI, the width and level of each detected pulse and the number of pulses that there would be in the interval $t_{17}$. If this is consistent with a radar type applicable to the regulatory region then a detection may be declared.

The radar detection mechanism may be implemented by storing the time, level and pulse width of each detection event, that is to say each potential radar pulse. When an interval of, for example, 15 ms has elapsed without further detection events, the stored radar detect events may be inspected. The radar events are initially qualified, to determine whether the RF level is sufficient to be recognized as a valid pulse. The pulse widths may then be inspected to reject any anomalous events. For example, if more than 50% of the pulse widths fall within a tolerance of 5 us, then all other pulses may be rejected from subsequent evaluation. The remaining pulses may then be evaluated by taking the intervals between them and sorting into ascending order. This gives a list of durations as shown in Table 1. It may be seen from these results that the fundamental Pulse Repetition Interval (PRI) can be determined, for example as the interval that is identified the most times.

TABLE 1

| Pulse interval | Comment |
| --- | --- |
| $t_{23}$ | Repetition of this time indicates |
| $t_{12}$ | that this is the PRI |
| $t_{67}$ | |
| $t_{45}$ | |
| $t_{56}$ | Invalid radar detection event |
| $t_{34}$ | Invalid radar detection event |

By a similar process, 2nd and 3rd PRIs may be identified for evaluation, if a type of radar having more than one PRI is applicable in the regulatory region or territory.

Figure 5:
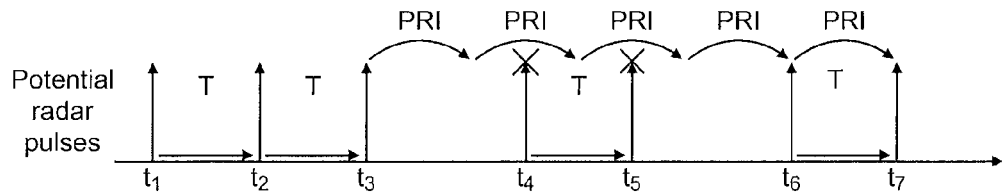
FIG. 5 is a schematic diagram illustrating identification of potential radar pulses as valid radar pulses.
Figure 6:
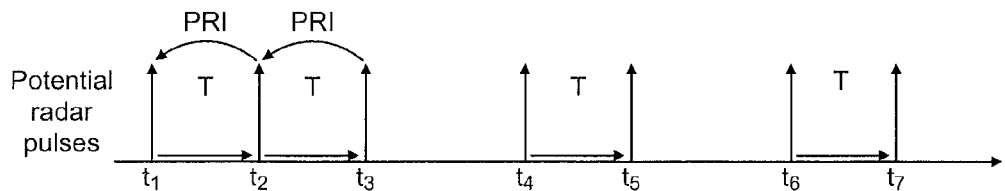
FIG. 6 is a schematic diagram illustrating identification of potential radar pulses as valid radar pulses.

FIGS. 5 and 6 illustrate an example of a process, according to an embodiment of the invention, of checking a provisionally detected pulse train for validity as a radar pulse train. As shown in FIG. 5, an interval having the shortest pulse interval can be seen to be $t_{23}$. So starting at position $t_3$, the interval $t_{34}$ is compared against the PRI and multiples of the PRI and fails to match. As a result, the interval $t_{35}$ is evaluated and also fails to match. The next interval $t_{36}$ however does match a multiple of the PRI and is declared a matching pulse. Subsequently, the interval $t_{67}$ is evaluated and also found to match. The summary is that 3 pulses have been accepted and the overall number of consecutive pulse intervals required to achieve this time interval is 6. A similar operation may be performed in reverse from the start point $t_3$ as shown in FIG. 6. The interval $t_{32}$ is compared against the PRI and found to match, as does the next interval $t_{21}$. The summary is that 2 additional pulses have been found to match. The total number of events used in the process is therefore 5 (3+2) and a total start to end for the pulse sequence is seen to be 8 (6+2).

An analysis of the total duration and the number of pulses used to derive the total is made, with reference to the possible radars in the regulatory region, and on the basis of a combination of these indicators a decision may be made as to whether the radar detection is made or rejected.

Figure 7:
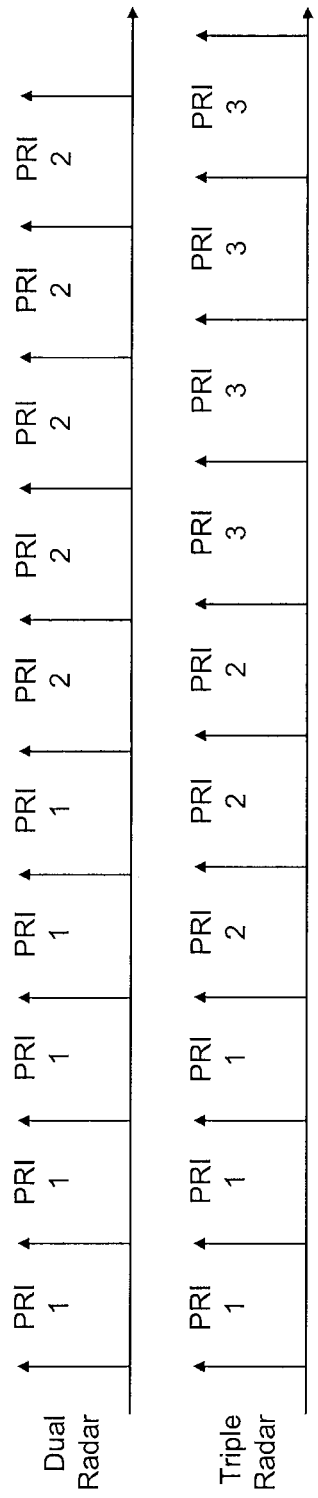
FIG. 7 is a schematic diagram showing examples of allowed radar PRI patterns.
Figure 8:
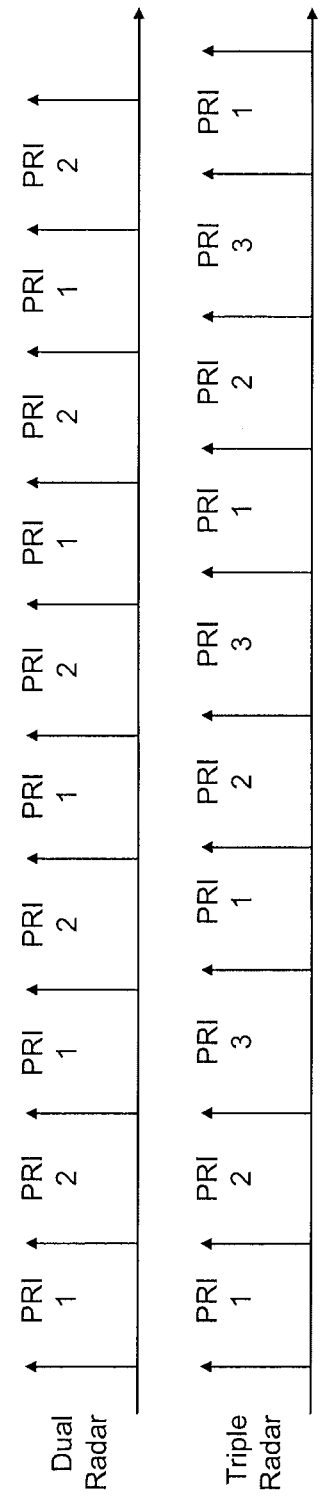
FIG. 8 is a schematic diagram showing further examples of allowed radar PRI patterns.

If the regulatory region in which the terminal is deployed requires support for more than one PRI, then the sorted list of PRIs is inspected to determine whether it is possible to identify multiple PRIs as mentioned above. If these PRIs are consistent and meet the regulatory constraints on the rate difference, for example, then they may be evaluated as follows. For the dual and triple PRI situation, the pulses may be matched individually as previously described, checking the validity of each PRI separately and then combining to reach an overall decision. An example of multiple PRI patterns is shown in FIG. 7. Note that there are usually more than 10 pulses of each PRI, and FIG. 7 is merely a schematic illustration. In the instance where the multiple PRIs are actually interspersed as shown FIG. 8, the pulse matching may use alternating PRIs in the case of dual and cycling PRIs for triple radars. For triple radars, the pattern may be checked in the order PRI1, PRI2, PRI3 and PRI1, PRI3, PRI2, since it may not be known in which order the radar will be presented.

In embodiments of the invention, statistical analysis of the pulses may be used to determine the PRI. It may be that the fundamental PRI is not discovered due to missing pulses, so that, for example, measured intervals may be multiples of a PRI. In an embodiment of the invention, iterative processing may be used to refine detection and further reject false radar detects during a valid sequence.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of transmission of data at a terminal of a broadband radio communication system, the terminal being arranged to inhibit the transmission of data dependent on detection of radar pulses, the radar pulses being transmitted with one or more pulse repetition intervals selected from a set of allowed pulse repetition intervals, the method comprising:
   conducting transmission of data in a frequency channel;
   receiving a signal waveform at the terminal;
   detecting a plurality of potential radar pulses in the received signal waveform;
   ascertaining a reception time for each of the plurality of potential radar pulses;
   selecting a pair of pulses from the plurality of potential radar pulses, the pair of pulses having respective reception times separated by a selected pulse repetition interval selected from the set of allowed pulse repetition intervals;
   selecting one or more further pulses, of the plurality of potential radar pulses, related to said selected pair by having a respective reception time separated from the respective reception time of at least one pulse of said pair of pulses by one or more pulse repetition intervals from the set of pulse repetition intervals;
   discounting at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and
   inhibiting the transmission of data in said frequency channel at least in part in dependence on the selection of the further pulses related to said selected pair.

2. A method according to claim 1, wherein said inhibiting the transmission of data is not in dependence on the discounted at least two other pulses.

3. A method according to claim 1, the method comprising:
   determining whether at least a pre-determined number of the further pulses have been selected; and
   inhibiting transmission of data in said frequency channel at least in part in dependence on said determining.

4. A method according to claim 1, wherein said selecting comprises:
   selecting the one or more further pulses, of the plurality of potential radar pulses, related to said selected pair by having a respective reception time separated from the respective reception time of at least one pulse of said pair of pulses by an integer multiple of a pulse repetition interval from the set of pulse repetition intervals.

5. A method according to claim 4, wherein said selecting comprises:
   selecting the one or more further pulses of the plurality of potential radar pulses having respective reception times separated from the respective reception time of at least one of the said pair by a combination of an integer multiple of the selected pulse repetition interval and an integer multiple of at least a second pulse repetition interval selected from the set of allowed pulse repetition intervals.

6. A method according to claim 5, wherein said selecting comprises:
   determining that the one or more further pulses have a sequence of reception times matching a pre-determined allowable sequence of reception times for a radar having pulse repetition intervals alternating between two values.

7. A method according to claim 5, wherein said selecting comprises:
   determining that the one or more further pulses have a sequence of reception times matching a pre-determined allowable sequence of reception times for a radar having pulse repetition intervals having three or more values.

8. A method according to claim 1, wherein said detecting of the plurality of potential radar pulses in the received signal waveform comprises:
   comparing a power of the received waveform with a threshold; and
   detecting a detected pulse in dependence on the power of the received waveform being above the threshold.

9. A method according to claim 8, wherein said detecting of the plurality of potential radar pulses in the received signal waveform comprises:
   determining a duration of a detected pulse; and
   identifying the detected pulse as a potential radar pulse on a basis of the duration of the detected pulse.

10. A method according to claim 8, wherein said detecting the plurality of potential radar pulses in the received signal waveform comprises:
    determining whether each detected pulse may be received as a wanted signal of the wireless communication system; and
    identifying a detected pulse as a potential radar pulse on a basis of the determination as to whether each detected pulse may be received as a wanted signal of the wireless communication system.

11. A method according to claim 10, wherein determining whether each detected pulse may be received as a wanted signal of the wireless communication system comprises receiving a training sequence of a wanted signal.

12. A method according to claim 10, wherein determining whether each detected pulse may be received as a wanted signal of the wireless communication system comprises receiving a cyclic prefix of an orthogonal frequency division multiplexing (OFDM) signal.

13. A method according to claim 1, wherein said detecting of the plurality of potential radar pulses in the received signal waveform comprises detecting an error in the reception of a wanted signal of the wireless communication system.

14. A method according to claim 1, wherein the broadband radio communication system operates according to IEEE 802.11.

15. A terminal for transmission of data in a broadband radio communication system, the terminal being arranged to inhibit the transmission of data dependent on detection of radar pulses, the radar pulses being transmitted with one or more pulse repetition intervals selected from a set of allowed pulse repetition intervals, the terminal comprising:

a transmitter arranged to conduct transmission of data in a frequency channel;

a receiver arranged to receive a signal waveform at the terminal;

a detector arranged to detect a plurality of potential radar pulses in the received signal waveform; and a processor arranged to:

ascertain a reception time for each of the plurality of potential radar pulses;

select a pair of pulses from the plurality of potential radar pulses, the pair of pulses having respective reception times separated by a selected pulse repetition interval selected from the set of allowed pulse repetition intervals;

select one or more further pulses, of the plurality of potential radar pulses, related to said selected pair by having a respective reception time separated from the respective reception time of at least one pulse of said pair of pulses by one or more pulse repetition intervals from the set of pulse repetition intervals;

discount at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and inhibit the transmission of data in said frequency channel at least in part in dependence on the selection of the further pulses related to said selected pair, and not in dependence on pulses not selected as the further pulses.

16. A non-transitory computer readable medium having instructions to cause a processor to cause a terminal to perform a method of transmission of data at a terminal of a broadband radio communication system, the terminal being arranged to inhibit the transmission of data dependent on detection of radar pulses, the radar pulses being transmitted with one or more pulse repetition intervals selected from a set of allowed pulse repetition intervals, the method comprising:

conducting transmission of data in a frequency channel;

receiving a signal waveform at the terminal;

detecting a plurality of potential radar pulses in the received signal waveform;

ascertaining a reception time for each of the plurality of potential radar pulses;

selecting a pair of pulses from the plurality of potential radar pulses, the pair of pulses having respective reception times separated by a selected pulse repetition interval selected from the set of allowed pulse repetition intervals;

selecting one or more further pulses, of the plurality of potential radar pulses, related to said selected pair by having a respective reception time separated from the respective reception time of at least one pulse of said pair of pulses by one or more pulse repetition intervals from the set of pulse repetition intervals;

discounting at least two other pulses from the plurality of potential radar pulses, the at least two other pulses having respective reception times separated by a pulse repetition interval in the set of allowed pulse repetition intervals, the at least two other pulses being discounted on the basis of not being related to said selected pair by having a respective reception time separated from the respective reception time of at least one pulse of said pair of pulses by one or more pulse repetition intervals from the set of pulse repetition intervals; and inhibiting the transmission of data in said frequency channel at least in part in dependence on the selection of the further pulses related to said selected pair.

\* \* \* \* \*